May 6, 1924.
R. F. POARCH
RESERVE FUEL TANK FOR MOTOR VEHICLES
Filed Aug. 10, 1922
1,492,744
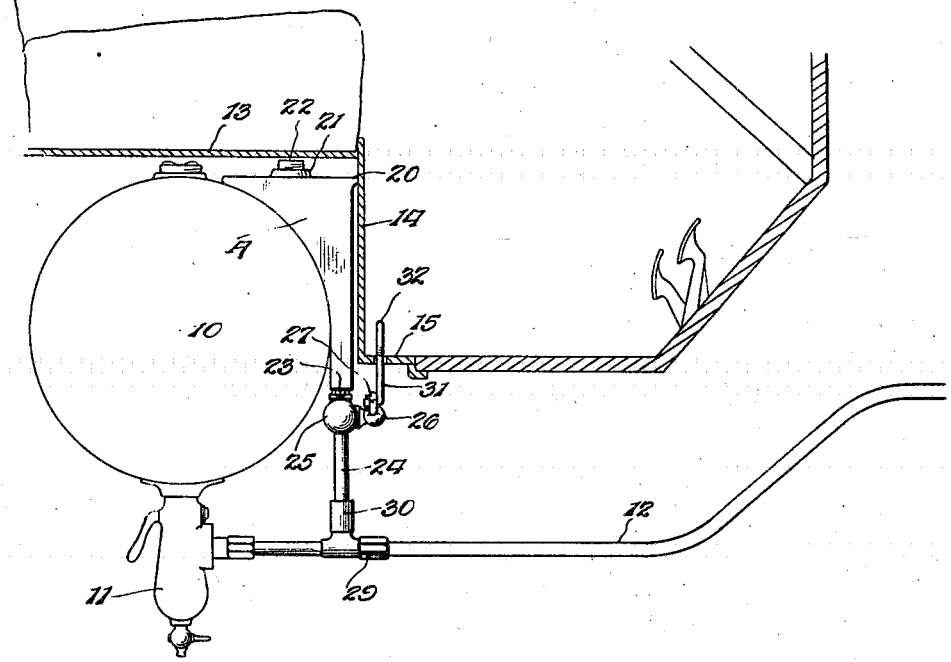
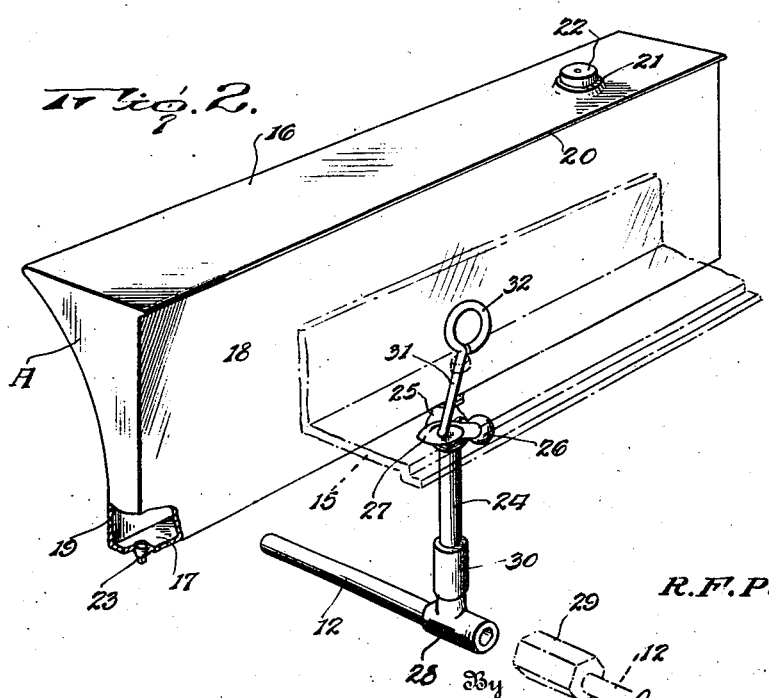
Inventor
R. F. Poarch.
By Lacey & Lacey, Attorneys Patented May 6, 1924.

1,492,744

UNITED STATES PATENT OFFICE.

RAYMOND F. POARCH, OF PETERSBURG, VIRGINIA, ASSIGNOR OF ONE-HALF TO EDWARD D. MACFEE, JR., OF PETERSBURG, VIRGINIA.

RESERVE-FUEL TANK FOR MOTOR VEHICLES.

Application filed August 10, 1922. Serial No. 580,977.

*To all whom it may concern:*

Be it known that I, RAYMOND F. POARCH, citizen of the United States, residing at Petersburg, in the county of Dinwiddie and State of Virginia, have invented certain new and useful Improvements in Reserve-Fuel Tanks for Motor Vehicles, of which the following is a specification.

This invention relates to an improved reserve or auxiliary fuel tank for motor vehicles and seeks, as one of its principal objects, to provide a tank which may be readily mounted adjacent the customary fuel tank of a vehicle and connected with the fuel supply line leading to the carburetor of the vehicle engine so that when the supply of fuel in the main tank is exhausted, fuel may be drawn from the reserve tank until a filling station is reached.

The invention has as a further object to provide a reserve tank which, in practical use, will be mounted against the fuel tank of the vehicle and wherein the reserve tank will be formed to fit fuel tanks of different shapes, thus adapting the device for a wide range of use.

And the invention has as a still further object to provide a reserve tank which may be readily applied and wherein the outlet valve of the tank may be conveniently operated so that said valve may be opened or closed from the driver's seat of the vehicle.

Other and incidental objects will appear hereinafter.

In the drawings:

Figure 1 is a fragmentary sectional view showing my improved reserve tank in connection with a Ford vehicle, and Figure 2 is a perspective view showing the tank in detail.

Referring now more particularly to the drawings, I have, for convenience, shown my improved reserve tank in connection with a Ford vehicle. The usual fuel tank of the vehicle is indicated at 10 and connected to the bottom of the tank is the customary sediment bulb 11 from which leads a fuel suply pipe 12 connected to the carburetor of the vehicle engine. As is well known, the tank 10 is arranged beneath the front seat of the vehicle and normally overlying the tank is a hinged cover 13. The counter of the front seat is indicated at 14 while the usual floor plate at the bottom of the counter is indicated at 15.

Coming now more particularly to the subject of the present invention, I employ a tank shell, indicated as a whole at A, and, as shown in Fig. 1, this shell is formed to rest between the tank 10 of the vehicle and the counter 14 of the front seat. The tank is tapered in cross section, being provided with a flat top wall 16, a flat bottom wall 17 which, however, is considerably narrower than the top wall, and a flat front wall 18, while the back wall 19 of the tank is curved inwardly toward the front wall between the top and bottom walls, being substantially concavo convex. Thus, as shown in Figure 1, the tank may be readily inserted between the counter and the main fuel tank 10 to rest upon the tank 10, the curved back wall 19 of the reserve tank fitting the curved wall of the main fuel tank. Projecting forwardly from the tank at the plane of the top wall 16 thereof is an overhanging lip or flange 20 resting against the counter for spacing the reserve tank therefrom so that rattling or squeaking such as might occur were these parts in direct contact, will be avoided. Upstanding from the top wall of the tank near one end thereof is a filler neck 21 upon which is threaded a cap 22 normally closing the tank and threaded through the bottom wall of the tank near the opposite end thereof is a drain plug 23 so that, when desired, the tank may be readily flushed and cleaned.

Connected to the bottom wall of the tank, preferably at a point substantially midway between the ends thereof, is an outlet pipe 24 in which is interposed an outlet valve 25 comprising a valve plug 26 having a handle 27. Interposed in the pipe 12 is a T 28 having threaded connection at one end with the pipe and connected at its opposite end to said pipe by a slip coupling 29. A similar slip coupling 30 connects the pipe 24 with the T so that when the valve 25 is opened, fuel may flow from the reserve tank to the pipe 12 and thence to the carbureter of the vehicle engine. Pivotally connected at its lower end to the handle 27 of the valve plug 26 is an operating rod 31. The floor plate 15 of the vehicle is provided with an opening to freely receive this rod therethrough and formed on the rod at its upper end is a loop 32. As will be observed, this loop is disposed to engage the floor plate for limiting the handle 27 in its downward swinging movement at the closed position of the valve plug. Accordingly, the rod will prevent the valve plug from creeping downward. At the same time, by grasping the loop 32 and pulling upwardly upon the rod, the handle 27 of the plug may be readily swung for opening the valve. Accordingly, as will be seen, when the supply of fuel in the main tank 10 becomes exhausted, the operator of the vehicle may, without leaving the driver's seat, open the valve 25 of the reserve tank when, as will be understood in view of the preceding description, fuel may be used from the reserve tank until a filling station is reached. As is well known, some Ford vehicles are provided with a cylindrical tank while others are provided with an elliptical shaped tank and, in either instance, the concavo convex back wall of the reserve tank will fit the tank of the vehicle. The device is accordingly adapted for a wide range of use and, in this connection, it is to be understood that while I have shown and described the device in connection with a Ford vehicle still, the device is also well adapted for use in connection with vehicles of other makes as, for instance, the Chevrolet. When used upon this make of vehicle, an extension pipe is preferably employed at the opening for the plug 23 when the outlet pipe 24 is connected to said extension pipe while said drain plug is engaged in the opening in the bottom wall of the tank previously occupied by said outlet pipe.

Having thus described the invention, what is claimed as new is:

In a motor vehicle having an upright transverse wall and a main cylindrical fuel tank placed in spaced relation thereto; a reserve tank, means for supporting the reserve tank at the upper end thereof between said wall and said main tank, said means including a concave side corresponding to the cylindrical side of said main tank and an overhanging lip projecting from the upper edge of the opposite side of the reserve tank, said opposite side and said lip being adapted to engage with said wall to space the flat side therefrom; each of said tanks having valved connection with a common supply pipe leading to the engine of the vehicle, and means situated adjacent said wall for operating the valved connection of the reserve tank.

In testimony whereof I affix my signature.

RAYMOND F. POARCH. [L. S.]